United States Patent
Chao et al.

(10) Patent No.: US 12,287,948 B2
(45) Date of Patent: Apr. 29, 2025

(54) VIRTUAL INTERFACE OPERATION METHOD, HEAD-MOUNTED DISPLAY DEVICE, AND COMPUTER-READABLE MEDIUM

(71) Applicant: HANGZHOU LINGBAN TECHNOLOGY CO. LTD., Hangzhou (CN)

(72) Inventors: Sun Chao, Hangzhou (CN); Shi Wenfeng, Hangzhou (CN); Li Tongyu, Hangzhou (CN)

(73) Assignee: HANGZHOU LINGBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 18/570,488

(22) PCT Filed: Jul. 13, 2022

(86) PCT No.: PCT/CN2022/105489
§ 371 (c)(1),
(2) Date: Dec. 14, 2023

(87) PCT Pub. No.: WO2023/284791
PCT Pub. Date: Jan. 19, 2023

(65) Prior Publication Data
US 2024/0281111 A1    Aug. 22, 2024

(30) Foreign Application Priority Data
Jul. 13, 2021    (CN) .......................... 202110788467.7

(51) Int. Cl.
*G06F 3/04815*    (2022.01)
*G06F 3/0484*    (2022.01)
(Continued)

(52) U.S. Cl.
CPC ........ *G06F 3/04815* (2013.01); *G06F 3/0484* (2013.01); *G06F 3/0488* (2013.01); *G06F 9/452* (2018.02); *G06F 2203/04808* (2013.01)

(58) Field of Classification Search
CPC .. G06F 3/04815; G06F 3/0484; G06F 3/0488; G06F 9/452; G06F 2203/04808;
(Continued)

(56) References Cited

U.S. PATENT DOCUMENTS

2014/0147032 A1    5/2014    Yous et al.
2018/0306898 A1    10/2018    Pusch et al.
(Continued)

FOREIGN PATENT DOCUMENTS

CN    106527722 A    3/2017
CN    107133002 A    9/2017
(Continued)

OTHER PUBLICATIONS

Ruihao et al., "Research on the application of webvr in art display", Modern Computer (Professional Edition), No. 08, Mar. 15, 2018, 6 pages.
CN202110788467.7—First Office Action mailed on Aug. 18, 2022, 15 pages.
(Continued)

*Primary Examiner* — Abhishek Sarma
(74) *Attorney, Agent, or Firm* — Getech Law LLC; Jun Ye (57) ABSTRACT

A virtual interface operation method, a head-mounted display device, and a computer-readable medium are disclosed. The virtual interface operation method includes: in response to detecting a single-finger sliding operation performed on a touch-sensitive display screen of a target device, determining a first sliding offset value corresponding to the single-finger sliding operation, where the target device is communicatively connected to a head-mounted display device; sliding an anchor corresponding to the single-finger sliding
(Continued)

operation in a 3D virtual interface of the head-mounted display device based on the first sliding offset value and a first preset sliding ratio, and displaying a ray from a target start point to the anchor in the 3D virtual interface; and, creating a 2D virtual interface in the 3D virtual interface, and displaying an application window corresponding to the single-finger tap operation in the 2D virtual interface.

12 Claims, 5 Drawing Sheets

(51) Int. Cl.
*G06F 3/0488* (2022.01)
*G06F 9/451* (2018.01)

(58) Field of Classification Search
CPC ............. G06F 3/04842; G06F 3/04883; G06F 3/04886; G06F 3/011; G06F 3/14
See application file for complete search history.

(56) References Cited

U.S. PATENT DOCUMENTS

| | | | |
|---|---|---|---|
| 2019/0227763 A1* | 7/2019 | Kaufthal | G06Q 10/101 |
| 2020/0357183 A1 | 11/2020 | Weber | |
| 2021/0295602 A1* | 9/2021 | Scapel | G06F 3/04815 |
| 2022/0121344 A1* | 4/2022 | Pastrana Vicente | G06F 3/0484 |
| 2022/0398844 A1* | 12/2022 | Wright, Jr. | H04N 7/147 |
| 2023/0289134 A1* | 9/2023 | Kannan | G06V 30/274 |

FOREIGN PATENT DOCUMENTS

| | | |
|---|---|---|
| CN | 108646997 A | 10/2018 |
| CN | 110428504 A | 11/2019 |
| CN | 111966255 A | 11/2020 |
| WO | 2021068885 A1 | 4/2021 |

OTHER PUBLICATIONS

Chenguang et al., "Research and implementation of multi-touch on large screen in virtual training system", Computer Simulation, vol. 30, Issue 03, Mar. 15, 2013, 9 pages.

* cited by examiner

VIRTUAL INTERFACE OPERATION METHOD, HEAD-MOUNTED DISPLAY DEVICE, AND COMPUTER-READABLE MEDIUM

CROSS-REFERENCE TO RELATED APPLICATIONS

This application is a 371 of international application PCT/CN2022/105489 filed Jul. 13, 2022, which claims priority to CN Application No. 202110788467.7, filed Jul. 13, 2021. The contents of each of the above-captioned patent applications are hereby expressly incorporated herein by reference in their entireties.

TECHNICAL FIELD

Embodiments of the present disclosure relate to the field of computer technologies, and in particular, to a virtual interface operation method, a head-mounted display device, and a computer-readable medium.

BACKGROUND

A head-mounted display device, such as augmented reality (AR) glasses or mixed reality (MR) glasses, may enable a user to view a virtual image by using a display screen of the AR or MR glasses. Currently, an interaction manner usually used after the head-mounted display device is connected to a computing device is as follows: In response to detecting an application start operation performed on a touch-sensitive display screen of the computing device, an application window corresponding to the application start operation is displayed in a virtual interface displayed on a display screen of the head-mounted display device.

However, when the foregoing interaction manner is used, the following technical problem usually exists: Only the application window that corresponds to the application start operation and that is displayed in the virtual interface can be controlled, and when operations need to be performed inside and outside the application window in the virtual interface, for example, when sliding or tap operations need to be separately performed inside the application window and outside the application window, the operations performed on the application window cannot be distinguished, and consequently control cannot be implemented inside and outside the application window.

SUMMARY

The SUMMARY part of the present disclosure is used to briefly describe concepts, and these concepts are described in detail in subsequent specific implementations. The SUMMARY of the present disclosure is not intended to identify key features or essential features of the claimed technical solutions, and is not intended to limit the scope of the claimed technical solutions.

Some embodiments of the present disclosure provide a virtual interface operation method, a head-mounted display device, and a computer-readable medium, to resolve a technical problem mentioned in the foregoing background.

According to a first aspect, some embodiments of the present disclosure provide a virtual interface operation method, where the method includes: in response to detecting a single-finger sliding operation performed on a touch-sensitive display screen of a target device, determining a first sliding offset value corresponding to the single-finger sliding operation, where the target device is communicatively connected to a head-mounted display device; sliding an anchor corresponding to the single-finger sliding operation in a 3D virtual interface of the head-mounted display device based on the first sliding offset value and a first preset sliding ratio, and displaying a ray from a target start point to the anchor in the 3D virtual interface, where the 3D virtual interface is displayed on a display screen of the head-mounted display device; and in response to detecting a single-finger tap operation performed on the touch-sensitive display screen and an anchor corresponding to the single-finger tap operation being at a target control location, creating a 2D virtual interface in the 3D virtual interface, and displaying an application window corresponding to the single-finger tap operation in the 2D virtual interface.

According to a second aspect, some embodiments of the present disclosure provide a head-mounted display device, including: one or more processors; a display screen, configured to display a 3D virtual interface and a 2D virtual interface; and a storage apparatus, storing one or more programs, where when the one or more programs are executed by the one or more processors, the one or more processors are enabled to implement the method described in any implementation of the foregoing first aspect.

According to a third aspect, some embodiments of the present disclosure provide a computer-readable medium, storing a computer program, where when the program is executed by a processor, the method described in any implementation of the foregoing first aspect is implemented.

The foregoing embodiments of the present disclosure have the following beneficial effects: According to the virtual interface operation method in some embodiments of the present disclosure, control can be performed inside and outside an application window displayed in a virtual interface. Specifically, a reason that control cannot be implemented inside and outside the application window displayed in the virtual interface is as follows: Only an application window that corresponds to an application start operation and that is displayed in the virtual interface can be controlled, and when operations need to be performed inside and outside the application window in the virtual interface, for example, when sliding or tap operations need to be separately performed inside the application window and outside the application window, the operations performed on the application window cannot be distinguished, and consequently control cannot be implemented inside and outside the application window. Based on this, according to the virtual interface operation method in some embodiments of the present disclosure, first, in response to detecting the single-finger sliding operation performed on the touch-sensitive display screen of the target device, the first sliding offset value corresponding to the single-finger sliding operation is determined. The target device is communicatively connected to the head-mounted display device. Then, the anchor corresponding to the single-finger sliding operation is slid in the 3D virtual interface of the head-mounted display device based on the first sliding offset value and the first preset sliding ratio, and the ray from the target start point to the anchor is displayed in the 3D virtual interface. The 3D virtual interface is displayed on the display screen of the head-mounted display device. Therefore, the single-finger sliding operation of a user on the touch-sensitive display screen can be visually displayed in the 3D virtual interface. Finally, in response to detecting the single-finger tap operation performed on the touch-sensitive display screen and the anchor corresponding to the single-finger tap operation being at the target control location, the 2D virtual interface is created in the 3D virtual interface, and the application window corresponding to the single-finger tap operation is displayed in the 2D virtual interface. Therefore, after tapping a target control on the touch-sensitive display screen, the user can browse an application window corresponding to the target control in the 2D virtual interface. It can be understood that the target control may be an application identifier control in a desktop window, or may be an application control in an application window. In addition, because display content of the virtual interface may be controlled based on the single-finger sliding operation and the single-finger tap operation of the user, control can be implemented inside or outside the application window displayed in the virtual interface.

BRIEF DESCRIPTION OF DRAWINGS

With reference to the accompanying drawings and the following specific implementations, the foregoing and other features, advantages, and aspects of the embodiments of the present disclosure will become more apparent. Same or similar reference signs throughout the accompanying drawings indicate same or similar elements. It should be understood that the accompanying drawings are examples, and parts and elements are not necessarily drawn to scale.

DESCRIPTION OF EMBODIMENTS

The following describes the embodiments of the present disclosure in more detail with reference to the accompanying drawings. Although some embodiments of the present disclosure are shown in the accompanying drawings, it should be understood that the present disclosure may be implemented in various forms and should not be construed as being limited to the embodiments described herein. Instead, these embodiments are provided for a more thorough and complete understanding of the present disclosure. It should be understood that the accompanying drawings and the embodiments of the present disclosure are merely used as examples, and are not intended to limit the protection scope of the present disclosure.

In addition, it should be further noted that, for ease of description, only a part associated with the related disclosure is shown in the accompanying drawings. The embodiments of the present disclosure and features in the embodiments may be mutually combined if they do not conflict with each other.

It should be noted that the concepts such as "first" and "second" mentioned in the present disclosure are merely used to distinguish between different apparatuses, modules, or units, and are not used to limit a sequence or an interdependence of functions performed by these apparatuses, modules, or units.

It should be noted that modifiers "one" and "a plurality of" mentioned in the present disclosure are examples and impose no limitation, and a person skilled in the art should understand that, unless otherwise specified in the context, the modifiers are understood as "one or more".

Names of messages or information exchanged between a plurality of apparatuses in the implementations of the present disclosure are only used for description, and are not used to limit a range of these messages or information.

The following describes the present disclosure in detail with reference to the accompanying drawings and the embodiments.

Figure 1:
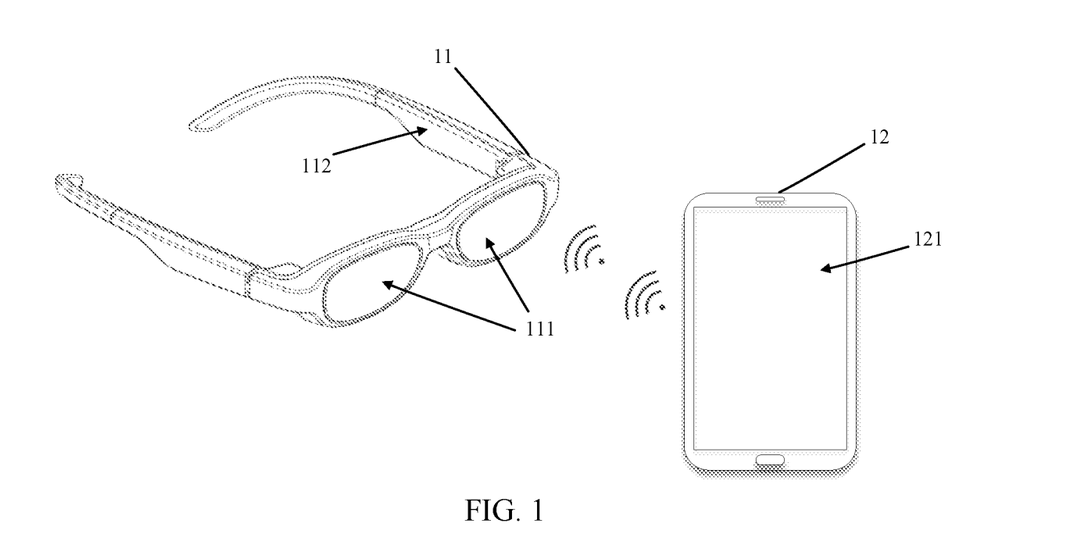
FIG. 1 is a diagram of an example system architecture to which some embodiments of the present disclosure may be applied.

FIG. 1 shows an example system architecture 100 of an embodiment of a virtual interface operation method that may be applied to the present disclosure.

As shown in FIG. 1, the example system architecture 100 may include a head-mounted display device 11 and a target device 12.

The head-mounted display device 11 may include one or two display screens 111. The display screen is configured to display a 3D virtual interface and a 2D virtual interface. In addition, the head-mounted display device 11 further includes a frame 112. In some embodiments, a sensor, a processing unit, a memory, and a battery of the head-mounted display device 11 may be placed inside the frame 112. In some optional implementations of some embodiments, one or more components in the sensor, the processing unit, the memory, and the battery may be integrated into another independent accessory (not shown), and connected to the frame 112 by using a data line. In some optional implementations of some embodiments, the head-mounted display device 11 may have only a display function and some sensors, and provide capabilities such as data processing, data storage, and power supply capabilities by using the target device 12.

The target device 12 may include a touch-sensitive display screen 121. In some embodiments, the head-mounted display device 11 and the target device 12 may communicate with each other in a wireless connection manner. In some optional implementations of some embodiments, the head-mounted display device 11 and the target device 12 may alternatively be connected by using a data line (not shown).

It should be understood that a quantity of head-mounted display devices and a quantity of target devices in FIG. 1 are merely examples. Based on an implementation requirement, there may be any suitable quantity of head-mounted display devices and any suitable quantity of target devices.

Figure 2:
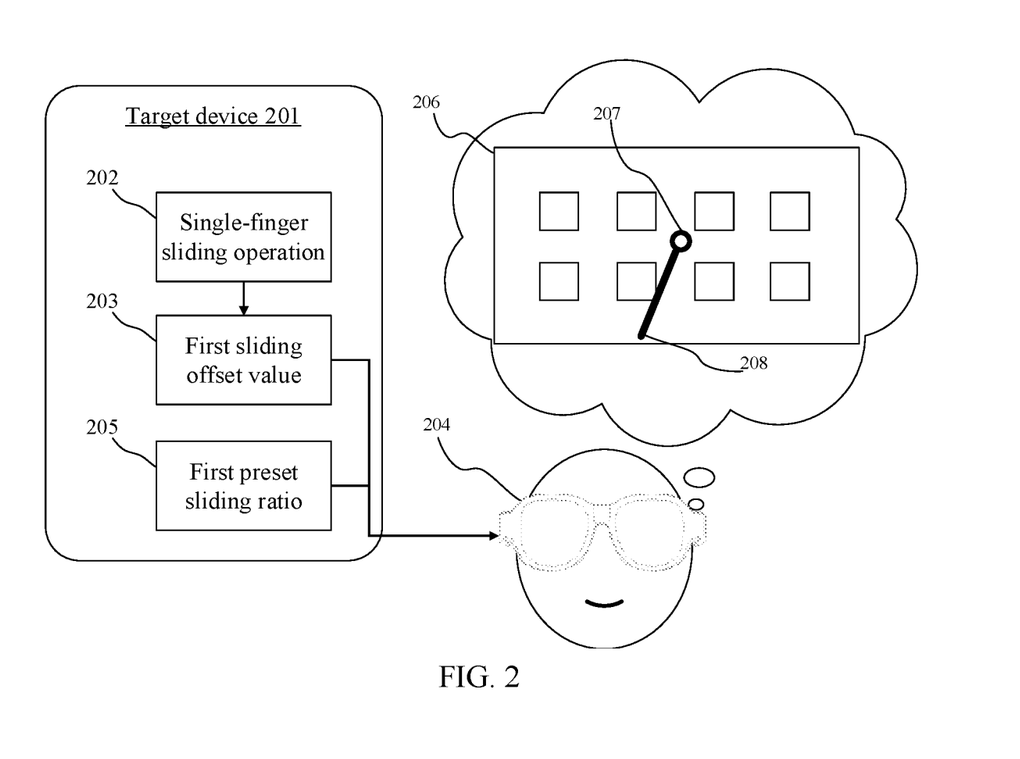
FIG. 2 and FIG. 3 are schematic diagrams of an application scenario of a virtual interface operation method according to some embodiments of the present disclosure.
Figure 3:
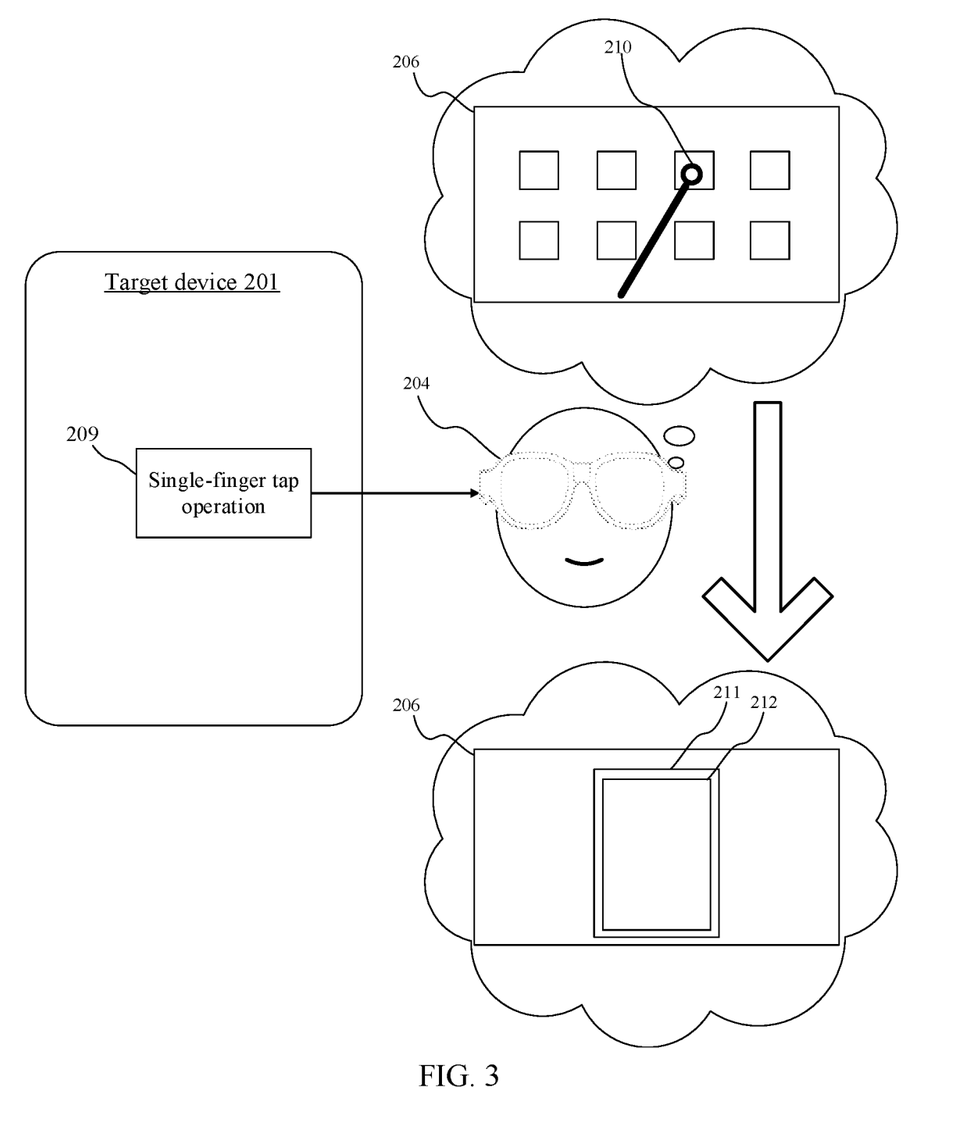

FIG. 2 and FIG. 3 are schematic diagrams of an application scenario of a virtual interface operation method according to some embodiments of the present disclosure.

As shown in FIG. 2, first, in response to detecting a single-finger sliding operation 202 performed on a touch-sensitive display screen of a target device, the target device 201 (for example, a mobile phone) may determine a first sliding offset value 203 corresponding to the single-finger sliding operation 202. The target device 201 is communicatively connected to a head-mounted display device 204. Then, the target device 201 may slide an anchor 207 corresponding to the single-finger sliding operation 202 in a 3D virtual interface 206 of the head-mounted display device 204 based on the first sliding offset value 203 and a first preset sliding ratio 205, and display a ray 208 from a target start point to the anchor 207 in the 3D virtual interface 206. The 3D virtual interface 206 is displayed on a display screen of the head-mounted display device 204. The 3D virtual interface 206 in FIG. 2 is displayed as a desktop window, and an application identifier control group is displayed in the desktop window. An application identifier control in the application identifier control group may be a control used to receive a selection operation of a user to display an application window corresponding to the application identifier control.

Finally, as shown in FIG. 3, in response to detecting a single-finger tap operation 209 performed on the touch-sensitive display screen and an anchor 210 corresponding to the single-finger tap operation 209 being at a target control location, the target device 201 may create a 2D virtual interface 211 in the 3D virtual interface 206, and display an application window 212 corresponding to the single-finger tap operation 209 in the 2D virtual interface 211. Herein, the target control location may be a location of an application identifier control in an application identifier control group in the 3D virtual interface 206. The anchor 210 being at the target control location means the anchor 210 being located on an application identifier control. An application page (for example, a running page of an application program XX) is displayed in the application window 212.

It can be understood that an execution body of the virtual interface operation method may be various types of software, or the execution body may be the target device 201, or the execution body may be a server, or the execution body may include a device formed by integrating the target device 201 and the server by using a network. The target device 201 may be various electronic devices that have an information processing capability, including but not limited to a smartphone, a tablet computer, an e-book reader, a laptop computer, a desktop computer, and the like. When the execution body of the virtual interface operation method is software, the software may be installed in the electronic device listed above. The software may be implemented as, for example, a plurality of pieces of software or a plurality of software modules that are used to provide a distributed service, or may be implemented as a single piece of software or a single software module. No specific limitation is imposed herein.

It should be understood that a quantity of target devices and a quantity of head-mounted display devices in FIG. 2 and FIG. 3 are merely examples. Based on an implementation requirement, there may be any quantity of target devices and any quantity of head-mounted display devices.

Figure 4:
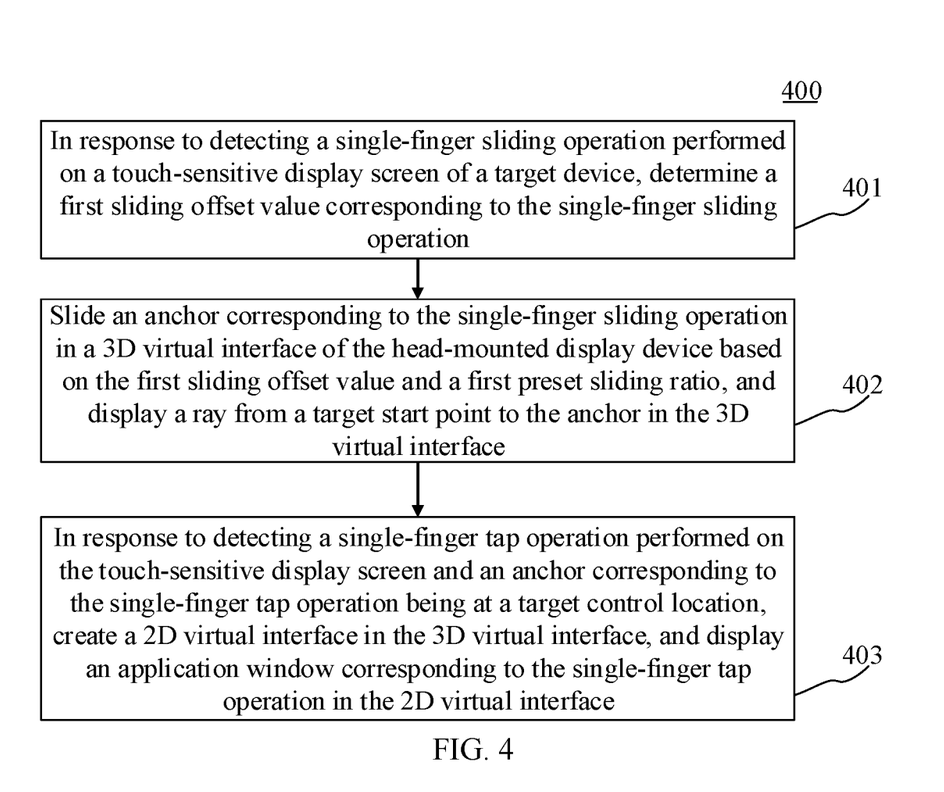
FIG. 4 is a flowchart of some embodiments of a virtual interface operation method according to the present disclosure.

Still refer to FIG. 4, which shows a procedure 400 of some embodiments of a virtual interface operation method according to the present disclosure. The virtual interface operation method includes the following steps:

Step 401: In response to detecting a single-finger sliding operation performed on a touch-sensitive display screen of a target device, determine a first sliding offset value corresponding to the single-finger sliding operation.

In some embodiments, in response to detecting the single-finger sliding operation performed on the touch-sensitive display screen of the target device, an execution body (for example, the head-mounted display device 11 shown in FIG. 1 or the target device 201 shown in FIG. 2) of the virtual interface operation method may determine the first sliding offset value corresponding to the single-finger sliding operation. The single-finger sliding operation may be a sliding operation performed on the touch-sensitive display screen by using one touch point. Herein, the touch point may be a point at which a finger of a user is in contact with the touch-sensitive display screen, or may be a point at which a stylus is in contact with the touch-sensitive display screen. The target device may be a computing device with a touch-sensitive display screen. For example, the target device may be but is not limited to one of the following: a mobile phone and a tablet computer. The target device is communicatively connected to the head-mounted display device. The head-mounted display device may be a head-mounted device used by the user to view a virtual image, and may be but is not limited to one of the following: a head-mounted augmented reality display device and a head-mounted mixed reality display device. For example, the head-mounted augmented reality display device may be AR glasses. The head-mounted mixed reality display device may be MR glasses. The head-mounted display device may display a desktop window and at least one application window. The first sliding offset value may be a distance between coordinates of an end touch point of the single-finger sliding operation and coordinates of a touch point of a previous frame. For example, the distance may be the Euclidean distance. The touch point of the previous frame may be a touch point displayed in a previous frame on the display screen of the head-mounted display device. Herein, a frame rate of the display screen is not limited. The end touch point may be a touch point existing when the single-finger sliding operation ends. The coordinates may be screen coordinates of the touch-sensitive display screen.

Optionally, a first preset sliding ratio is determined based on a sliding speed of the single-finger sliding operation. In practice, the execution body may first determine a speed interval in which the sliding speed is located. Then, the execution body may determine a sliding ratio corresponding to the speed interval as the first preset sliding ratio. Herein, the execution body may determine the speed interval in which the sliding speed is located and the sliding ratio corresponding to the speed interval by using a preset speed interval-sliding ratio reference table. The speed interval-sliding ratio reference table includes each speed interval and a sliding ratio corresponding to each speed interval. A larger sliding speed corresponding to the speed interval indicates a larger first preset sliding ratio corresponding to the speed interval. Therefore, the first preset sliding ratio may be dynamically adjusted.

Step 402: Slide an anchor corresponding to the single-finger sliding operation in a 3D virtual interface of the head-mounted display device based on the first sliding offset value and the first preset sliding ratio, and display a ray from a target start point to the anchor in the 3D virtual interface.

In some embodiments, the execution body may slide the anchor corresponding to the single-finger sliding operation in the 3D virtual interface of the head-mounted display device based on the first sliding offset value and the first preset sliding ratio, and display the ray from the target start point to the anchor in the 3D virtual interface. The first preset sliding ratio may be a preset ratio used to adjust the first sliding offset value of the single-finger sliding operation in the 3D virtual interface. For example, the first preset sliding ratio may be 200%. The 3D virtual interface may be an interface displayed on the display screen of the head-mounted display device in a three-dimensional form. The anchor may be a point obtained after a touch point of the single-finger sliding operation is visually displayed in the 3D virtual interface. In practice, the execution body may display, in the 3D virtual interface, an anchor obtained by mapping coordinates of the touch point of the single-finger sliding operation, so that a distance between 3D virtual interface coordinates of an anchor corresponding to an end touch point and 3D virtual interface coordinates of an anchor corresponding to a touch point of a previous frame is a product of the first sliding offset value and the first preset sliding ratio. For example, the execution body may determine a product of a horizontal coordinate included in the coordinates of the touch point of the single-finger sliding operation and the first preset sliding ratio as a horizontal coordinate in the 3D virtual interface coordinates of the anchor obtained through mapping. The execution body may determine a product of a vertical coordinate included in the coordinates of the touch point of the single-finger sliding operation and the first preset sliding ratio as a vertical coordinate in the 3D virtual interface coordinates of the anchor obtained through mapping. The 3D virtual interface coordinates may be coordinates on the display screen of the head-mounted display device. It can be understood that, when the touch point is continuously slid, the anchor may be continuously slid in the 3D virtual interface, or the anchor may be slid in the 3D virtual interface based on a specified time interval.

The target start point may be a 3D virtual interface coordinate point corresponding to a virtual camera point in the 3D virtual interface. The virtual camera point may be a location point for viewing. For example, the virtual camera point may be a location point of the unity Main Camera. The 3D virtual interface coordinate point corresponding to the virtual camera point may be a 3D virtual interface coordinate point that is offset relative to the unity Main Camera. Herein, an offset direction and an offset distance are not limited. In practice, the execution body may display the ray from the target start point to the anchor in a process of displaying the anchor through sliding. Herein, rendering styles of the anchor and the ray may be preset styles, and are not limited. For example, the anchor may be a dot with a predetermined radius and a predetermined filling color. The ray may be a line or an arrow with a predetermined width and a predetermined filling color. Therefore, the single-finger sliding operation of the user on the touch-sensitive display screen can be visually displayed in the 3D virtual interface.

Optionally, in response to a touch control mode of the touch-sensitive display screen being a landscape mode, the following steps are performed:

Step 1: Determine a vertical offset value of the anchor corresponding to the single-finger sliding operation in the 3D virtual interface based on a short-side offset value of the first sliding offset value in a short-side direction of the touch-sensitive display screen and the first preset sliding ratio. The landscape mode may be a mode in which a long side of the touch-sensitive display screen is horizontally placed. Herein, when the execution body is connected to the head-mounted display device, a default touch control mode is a portrait mode. The portrait mode may be a mode in which the long side of the touch-sensitive display screen is vertically placed. The short-side direction may be a direction upward or downward along a short side of the touch-sensitive display screen. Herein, "upward" or "downward" is a direction in which the user is a subject. The short-side offset value may be an offset value, in the short-side direction, of the first sliding offset value of the single-finger sliding operation in a sliding direction. It can be understood that a direction of the short-side offset value corresponds to the sliding direction. For example, a positive direction of a horizontal axis of a screen coordinate system is horizontally rightward. When the sliding direction is a 45-degree direction of the positive direction of the horizontal axis of the screen coordinate system, the direction of the short-side offset value is upward. The vertical offset value may be a vertical offset value of the anchor in the 3D virtual interface. In practice, the execution body may determine a product of the short-side offset value and the first preset sliding ratio as the vertical offset value of the anchor corresponding to the single-finger sliding operation in the 3D virtual interface.

Step 2: Determine a horizontal offset value of the anchor corresponding to the single-finger sliding operation in the 3D virtual interface based on a long-side offset value of the first sliding offset value in a long-side direction of the touch-sensitive display screen and the first preset sliding ratio. The long-side direction may be a direction leftward or rightward along a long side of the touch-sensitive display screen. Herein, "leftward" or "rightward" is a direction in which the user is a subject. The long-side offset value may be an offset value, in the long-side direction, of the first sliding offset value of the single-finger sliding operation in a sliding direction. It can be understood that a direction of the long-side offset value corresponds to the sliding direction. For example, a positive direction of a horizontal axis of a screen coordinate system is horizontally rightward. When the sliding direction is a 45-degree direction of the positive direction of the horizontal axis of the screen coordinate system, the direction of the long-side offset value is rightward. The horizontal offset value may be a horizontal offset value of the anchor in the 3D virtual interface. In practice, the execution body may determine a product of the long-side offset value and the first preset sliding ratio as the horizontal offset value of the anchor corresponding to the single-finger sliding operation in the 3D virtual interface.

Step 3: Slide the anchor corresponding to the single-finger sliding operation in the 3D virtual interface based on the vertical offset value and the horizontal offset value. In practice, the execution body may slide the anchor in the directions of both the vertical offset value and the horizontal offset value in the 3D virtual interface, so that the anchor is slid by pixels of a quantity equal to the vertical offset value in a vertical direction of the 3D virtual interface, and is slid by pixels of the horizontal offset value in a horizontal direction thereof. Therefore, the 3D virtual interface can be operated in the touch control mode that is the landscape mode.

Step 403: In response to detecting a single-finger tap operation performed on the touch-sensitive display screen and an anchor corresponding to the single-finger tap operation being at a target control location, create a 2D virtual interface in the 3D virtual interface, and display an application window corresponding to the single-finger tap operation in the 2D virtual interface.

In some embodiments, in response to detecting the single-finger tap operation performed on the touch-sensitive display screen and the anchor corresponding to the single-finger tap operation being at the target control location, the execution body may create the 2D virtual interface in the 3D virtual interface, and display the application window corresponding to the single-finger tap operation in the 2D virtual interface. The single-finger tap operation may be a tap operation performed at one touch point. The anchor corresponding to the single-finger tap operation may be a point obtained after a touch point corresponding to the single-finger tap operation is visually displayed in the 3D virtual interface. The 2D virtual interface may be an interface displayed on the display screen of the head-mounted display device in a two-dimensional form.

When the anchor is in the desktop window in the 3D virtual interface, the target control location may be a location, in the 3D virtual interface, of an application identifier control displayed in the desktop window. The application identifier control may be a control used to receive a single-finger tap operation of the user to display a corresponding application window. In practice, the execution body may display the application window corresponding to the application identifier control in the 2D virtual interface.

When the anchor is in the desktop window in the 3D virtual interface, the target control location may alternatively be a location, in the 3D virtual interface, of a setting control displayed in the desktop window. The setting control may be a control used to receive a single-finger tap operation of the user to display a corresponding application window used to set a related configuration. For example, the setting control may be a control used to set display brightness of the 3D virtual interface. The setting control may alternatively be a control used to set layout of an application window displayed in the 3D virtual interface. In practice, the execution body may display the application window corresponding to the setting control in the 2D virtual interface.

When the anchor is in the application window in the 3D virtual interface, the target control location may be a location of an application control displayed in the application window. The application control may be used to receive a single-finger tap operation of the user to display an application window in which application content corresponding to an application control is displayed. For example, the application control may be a page refresh control, and is used to receive a single-finger tap operation of the user to display an application window obtained after page refresh. The application control may alternatively be a page redirection control, and is used to receive a single-finger tap operation of the user to display an application window obtained after page redirection. In practice, the execution body may display the application window corresponding to the application control in the 2D virtual interface.

Therefore, after tapping a target control on the touch-sensitive display screen, the user can browse an application window corresponding to the target control in the 2D virtual interface.

Optionally, in response to detecting a sliding operation or a tap operation that is performed on the touch-sensitive display screen, the execution body may send the sliding operation or the tap operation to the display screen through mapping. The sliding operation may include but is not limited to one of the following: a single-finger sliding operation, a two-finger sliding operation, and a three-finger sliding operation. The tap operation may include but is not limited to one of the following: a single-finger tap operation, a two-finger tap operation, and a three-finger tap operation. In practice, the execution body may obtain a MotionEvent object by using a touch event corresponding to a sliding operation or a tap operation. Then, the execution body may invoke a setDisplayId method parameter of InputEvent through reflection, and set, to an ID of the display screen, an ID of an external screen to which the MotionEvent object is to be mapped. Finally, the execution body may invoke an injectInputEvent method of InputManager through reflection, and send the touch event to the display screen. The foregoing embodiments of the present disclosure have the following beneficial effects: According to the virtual interface operation method in some embodiments of the present disclosure, control can be performed inside and outside an application window displayed in a virtual interface. Specifically, a reason that control cannot be implemented inside and outside the application window displayed in the virtual interface is as follows: Only an application window that corresponds to an application start operation and that is displayed in the virtual interface can be controlled, and when operations need to be performed inside and outside the application window in the virtual interface, for example, when sliding or tap operations need to be separately performed inside the application window and outside the application window, the operations performed on the application window cannot be distinguished, and consequently control cannot be implemented inside and outside the application window. Based on this, according to the virtual interface operation method in some embodiments of the present disclosure, first, in response to detecting the single-finger sliding operation performed on the touch-sensitive display screen of the target device, the first sliding offset value corresponding to the single-finger sliding operation is determined. The target device is communicatively connected to the head-mounted display device. Then, the anchor corresponding to the single-finger sliding operation is slid in the 3D virtual interface of the head-mounted display device based on the first sliding offset value and the first preset sliding ratio, and the ray from the target start point to the anchor is displayed in the 3D virtual interface. The 3D virtual interface is displayed on the display screen of the head-mounted display device. Therefore, the single-finger sliding operation of a user on the touch-sensitive display screen can be visually displayed in the 3D virtual interface. Finally, in response to detecting the single-finger tap operation performed on the touch-sensitive display screen and the anchor corresponding to the single-finger tap operation being at the target control location, the 2D virtual interface is created in the 3D virtual interface, and the application window corresponding to the single-finger tap operation is displayed in the 2D virtual interface. Therefore, after tapping a target control on the touch-sensitive display screen, the user can browse an application window corresponding to the target control in the 2D virtual interface. It can be understood that the target control may be an application identifier control in a desktop window, or may be an application control in an application window. In addition, because display content of the virtual interface may be controlled based on the single-finger sliding operation and the single-finger tap operation of the user, control can be implemented inside or outside the application window displayed in the virtual interface.

Figure 5:
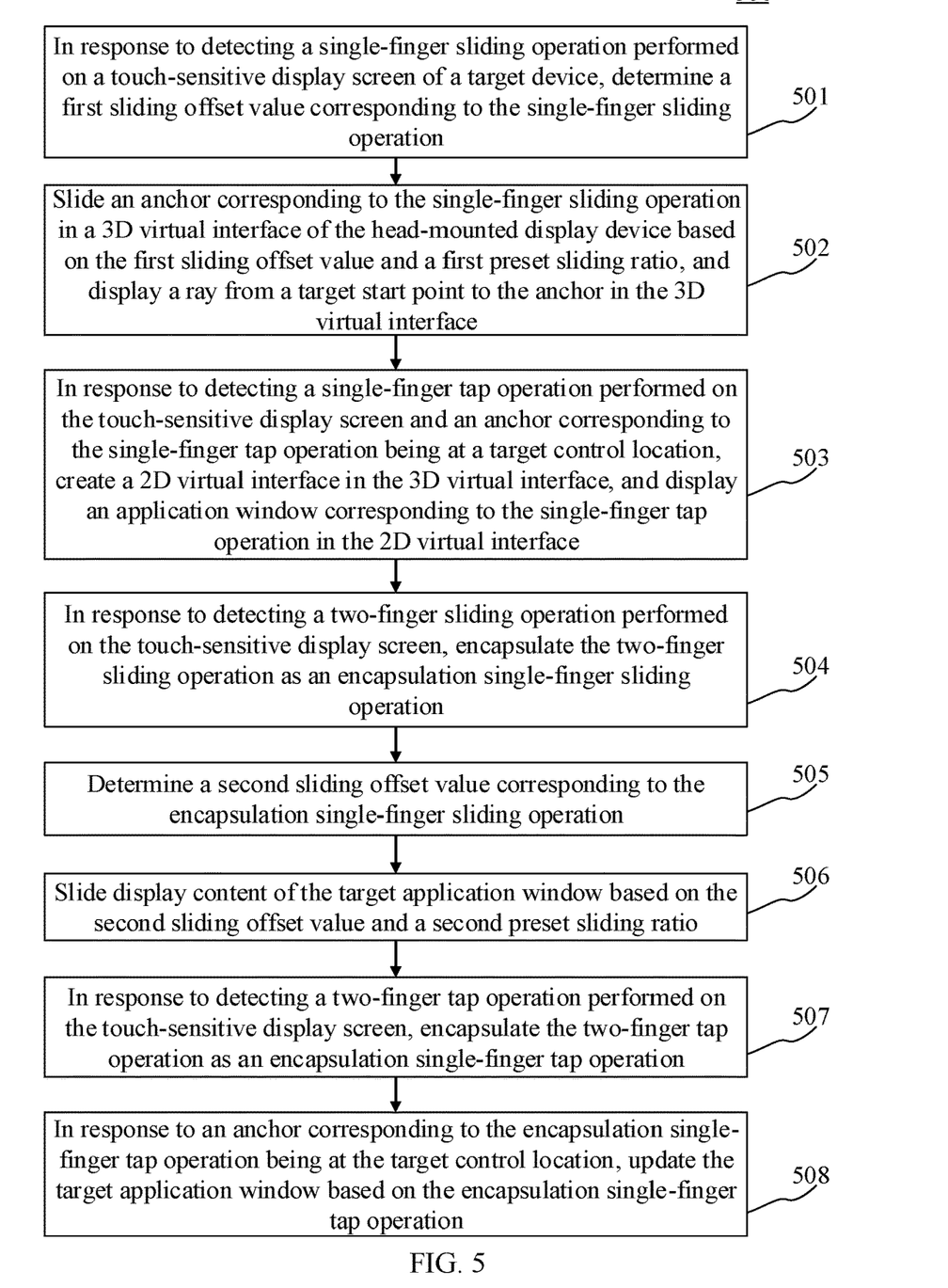
FIG. 5 is a flowchart of some other embodiments of a virtual interface operation method according to the present disclosure.

Further refer to FIG. 5, which shows a procedure 500 of some other embodiments of a virtual interface operation method. The procedure 500 of the virtual interface operation method includes the following steps:

Step 501: In response to detecting a single-finger sliding operation performed on a touch-sensitive display screen of a target device, determine a first sliding offset value corresponding to the single-finger sliding operation.

Step 502: Slide an anchor corresponding to the single-finger sliding operation in a 3D virtual interface of the head-mounted display device based on the first sliding offset value and the first preset sliding ratio, and display a ray from a target start point to the anchor in the 3D virtual interface.

Step 503: In response to detecting a single-finger tap operation performed on the touch-sensitive display screen and an anchor corresponding to the single-finger tap operation being at a target control location, create a 2D virtual interface in the 3D virtual interface, and display an application window corresponding to the single-finger tap operation in the 2D virtual interface.

In some embodiments, for specific implementations of step 501 to step 503 and technical effects brought by step 501 to step 503, refer to step 401 to step 403 in those embodiments corresponding to FIG. 4. Details are not described herein again.

Step 504: In response to detecting a two-finger sliding operation performed on the touch-sensitive display screen, encapsulate the two-finger sliding operation as an encapsulation single-finger sliding operation.

In some embodiments, in response to detecting the two-finger sliding operation performed on the touch-sensitive display screen, an execution body (for example, the head-mounted display device 11 shown in FIG. 1 or the target device 201 shown in FIG. 2) of the virtual interface operation method may encapsulate the two-finger sliding operation as the encapsulation single-finger sliding operation. The two-finger sliding operation may be a sliding operation performed on the touch-sensitive display screen by using two touch points. The two-finger sliding operation corresponds to a target application window displayed in the 3D virtual interface. The target application window may be a currently selected application window. In practice, the execution body may determine the first touch point corresponding to the two-finger sliding operation as a target touch point. The target touch point may be used as a touch point of the encapsulation single-finger sliding operation, thereby implementing encapsulation on the two-finger sliding operation. The first touch point may be a touch point on the left side. It may be understood that, the left side is a side on which a user is a subject. The first touch point may alternatively be a touch point that is first in contact with the touch-sensitive display screen.

Step 505: Determine a second sliding offset value corresponding to the encapsulation single-finger sliding operation.

In some embodiments, the execution body may determine the second sliding offset value corresponding to the encapsulation single-finger sliding operation. The second sliding offset value may be a distance between coordinates of an end touch point of the encapsulation single-finger sliding operation and coordinates of a touch point of a previous frame. The end touch point of the encapsulation single-finger sliding operation is a target touch point existing when the encapsulation single-finger sliding operation ends.

Step 506: Slide display content of the target application window based on the second sliding offset value and a second preset sliding ratio.

In some embodiments, the execution body may slide the display content of the target application window based on the second sliding offset value and the second preset sliding ratio. The second preset sliding ratio may be a preset ratio used to adjust the second sliding offset value of the encapsulation single-finger sliding operation in the target application window. For example, the second preset sliding ratio may be 150%. In practice, the execution body may slide the display content of the target application window based on a sliding direction of the encapsulation single-finger sliding operation. A sliding distance of the display content is a product of the second sliding offset value and the second preset sliding ratio. Therefore, after sliding a selected application window with two fingers on the touch-sensitive display screen, the user can browse display content of the slid application window.

Step 507: In response to detecting a two-finger tap operation performed on the touch-sensitive display screen, encapsulate the two-finger tap operation as an encapsulation single-finger tap operation.

In some embodiments, in response to detecting the two-finger tap operation performed on the touch-sensitive display screen, the execution body may encapsulate the two-finger tap operation as the encapsulation single-finger tap operation. The two-finger tap operation may be a tap operation performed by using two touch points. The two-finger tap operation corresponds to the target application window.

In practice, the execution body may determine the first touch point corresponding to the two-finger tap operation as a target touch point. The target touch point may be used as a touch point of the encapsulation single-finger tap operation, thereby implementing encapsulation on the two-finger tap operation. The first touch point may be a touch point on the left side. It may be understood that, the left side is a side on which the user is a subject. The first touch point may alternatively be a touch point that is first in contact with the touch-sensitive display screen.

Step 508: In response to an anchor corresponding to the encapsulation single-finger tap operation being at the target control location, update the target application window based on the encapsulation single-finger tap operation.

In some embodiments, in response to the anchor corresponding to the encapsulation single-finger tap operation being at the target control location, the execution body may update the target application window based on the encapsulation single-finger tap operation. Herein, the target control location may be a location of an application control in the target application window. For example, the application control may be a page refresh control, and is used to receive a single-finger tap operation of the user to display a target application window obtained after page refresh. The application control may alternatively be a page redirection control, and is used to receive a single-finger tap operation of the user to display a target application window obtained after page redirection. In practice, the execution body may display preset display content corresponding to the encapsulation single-finger tap operation in the target application window, to update the target application window. The preset display content may be display content associated with an application control corresponding to the encapsulation single-finger tap operation. For example, when the application control is a page refresh control, the preset display content may be a refreshed page. When the application control is a page redirection control, the preset display content may be a redirected page. Therefore, after tapping an application control in a selected application window with two fingers on the touch-sensitive display screen, the user can browse the updated application window.

Optionally, in response to detecting a three-finger sliding operation performed on the touch-sensitive display screen, and an application window being first displayed in the 3D virtual interface, the execution body may determine a sliding direction, a sliding distance, and a sliding acceleration that correspond to the three-finger sliding operation. The three-finger sliding operation may be a sliding operation performed on the touch-sensitive display screen by using three touch points. In practice, first, the execution body may encapsulate the three-finger sliding operation as a single-finger sliding operation. For example, the execution body may determine the first touch point corresponding to the three-finger sliding operation as a target touch point. The target touch point may be used as a touch point of the single-finger sliding operation obtained after encapsulation, thereby implementing encapsulation on the three-finger sliding operation. The first touch point may be a first touch point on the left side. It may be understood that, the left side is a side on which the user is a subject. The first touch point may alternatively be a touch point that is first in contact with the touch-sensitive display screen. Then, a sliding direction, a sliding distance, and a sliding acceleration that correspond to the single-finger sliding operation obtained after encapsulation may be respectively determined as the sliding direction, the sliding distance, and the sliding acceleration that correspond to the three-finger sliding operation.

Optionally, in response to the sliding direction being upward, the sliding distance being greater than or equal to a first sliding distance, and the sliding acceleration being greater than or equal to a first sliding acceleration, the execution body may switch to a desktop window. The first sliding distance may be a preset sliding distance. The first sliding acceleration may be a preset sliding acceleration. Specific settings of the first sliding distance and the first preset sliding acceleration are not limited. In practice, the execution body may close the application window displayed in the 3D virtual interface, and switch to the desktop window. Herein, "upward" is a direction in which the user is a subject. Therefore, after sliding upward with three fingers on the touch-sensitive display screen, the user can browse the desktop window.

Optionally, in response to a previous application window of the target application window existing in the 3D virtual interface, the sliding direction being leftward, the sliding distance being greater than or equal to a second sliding distance, and the sliding acceleration being greater than or equal to a second sliding acceleration, the execution body may switch to the previous application window. The target application window may be a selected application window. The previous application window may be an application window displayed on the left side of the target application window, or may be an application window last displayed before the target application window is displayed. The second sliding distance may be a preset sliding distance. The second sliding acceleration may be a preset sliding acceleration. Specific settings of the second sliding distance and the second preset sliding acceleration are not limited. Herein, "leftward" and the left side are a direction in which the user is a subject. Therefore, after sliding leftward with three fingers on the touch-sensitive display screen, the user can browse the previous application window.

Optionally, in response to a next application window of the target application window existing in the 3D virtual interface, the sliding direction being rightward, the sliding distance being greater than or equal to a third sliding distance, and the sliding acceleration being greater than or equal to a third sliding acceleration, the execution body may switch to the next application window. The target application window may be a selected application window. The next application window may be an application window displayed on the right side of the target application window, or may be an application window first displayed after the target application window is displayed. The third sliding distance may be a preset sliding distance. The third sliding acceleration may be a preset sliding acceleration. Specific settings of the third sliding distance and the third preset sliding acceleration are not limited. Herein, "rightward" and the right side are a direction in which the user is a subject. Therefore, after sliding rightward with three fingers on the touch-sensitive display screen, the user can browse the next application window.

It can be learned from FIG. 5 that, compared with the descriptions in some embodiments corresponding to FIG. 4, the procedure 500 of the virtual interface operation method in some embodiments corresponding to FIG. 5 reflects steps of extending the two-finger sliding operation and the two-finger tap operation that correspond to the target application window. Therefore, in the solutions described in these embodiments, after sliding a selected application window with two fingers on the touch-sensitive display screen, the user can browse display content of the slid application window. In addition, after tapping an application control in a selected application window with two fingers on the touch-sensitive display screen, the user can browse the updated application window.

Figure 6:
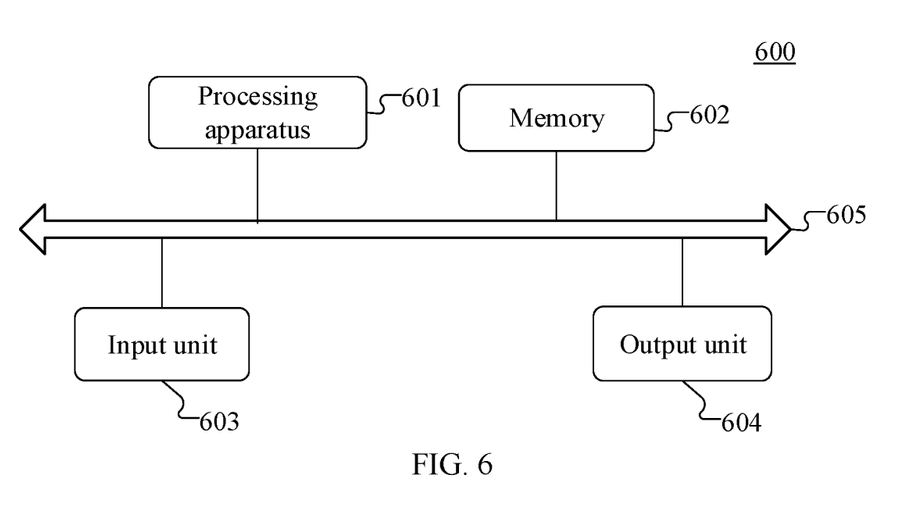
FIG. 6 is a schematic diagram of a structure of a head-mounted display device suitable for implementing some embodiments of the present disclosure.

In the following, FIG. 6 is a schematic diagram of a hardware structure of a head-mounted display device (for example, the head-mounted display device in FIG. 1) 600 suitable for implementing some embodiments of the present disclosure. The head-mounted display device shown in FIG. 6 is merely an example, and should not impose any limitation on functions and scope of use of the embodiments of the present disclosure.

As shown in FIG. 6, the head-mounted display device 600 may include a processing apparatus (such as a central processing unit and a graphics processing unit) 601, a memory 602, an input unit 603, and an output unit 604. The processing apparatus 601, the memory 602, the input unit 603, and the output unit 604 are connected to each other by using a bus 605. Herein, the method according to the embodiments of the present disclosure may be implemented as a computer program and stored in the memory 602. For example, in some embodiments of the present disclosure, a computer program product is included, where the computer program product includes a computer program carried on a computer-readable medium, and the computer program includes program code used to perform the method shown in the flowchart. The processing apparatus 601 in the head-mounted display device specifically implements, by invoking the computer program stored in the memory 602, the virtual interface operation function defined in the method according to the present disclosure. In some implementations, the input unit 603 may include a touch control device (for example, a touch-sensitive display screen of a target device). Therefore, the touch control device in the input unit 603 may sense whether an operation performed by a user on a virtual interface is detected. Further, in response to the operation performed by the user on the virtual interface being detected, the processing apparatus 601 may invoke the computer program to perform an application page display function. The output unit 604 may include a display screen, configured to display a 3D virtual interface and a 2D virtual interface.

It should be noted that the computer-readable medium described in some embodiments of the present disclosure may be a computer-readable signal medium, a computer-readable storage medium, or any combination thereof. The computer-readable storage medium may be, for example, an electrical, magnetic, optical, electromagnetic, infrared, or semiconductor system, apparatus, or device, or any combination thereof. A more specific example of the computer-readable storage medium may include but is not limited to an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In some embodiments of the present disclosure, the computer-readable storage medium may be any tangible medium that includes or stores a program, and the program may be used by or in combination with an instruction execution system, apparatus, or device. In some embodiments of the present disclosure, the computer-readable signal medium may include a data signal propagated in a baseband or as a part of a carrier, and carries computer-readable program code. The propagated data signal may be in a plurality of forms, including but not limited to an electromagnetic signal, an optical signal, or any suitable combination thereof. The computer-readable signal medium may alternatively be any computer-readable medium other than a computer-readable storage medium, and the computer-readable signal medium may send, propagate, or transmit a program used by or in combination with an instruction execution system, apparatus, or device. The program code included in the computer-readable medium may be transmitted by using any suitable medium, including but not limited to a wire, an optical cable, radio frequency (RF), or any suitable combination thereof.

In some implementations, a client and a server may communicate with each other by using any network protocol currently known or developed in the future, such as Hypertext Transfer Protocol (HTTP), and may be interconnected with digital data communication (for example, a communication network) in any form or medium. Examples of the communication network include a local area network ("LAN"), a wide area network ("WAN"), the Internet (for example, the Internet), a peer-to-peer network (for example, an ad hoc peer-to-peer network), and any network currently known or developed in the future.

The computer-readable medium may be included in the head-mounted display device, or may exist independently, and is not assembled into the head-mounted display device. The computer-readable medium carries one or more programs. When the one or more programs are executed by the head-mounted display device, the head-mounted display device is enabled to perform the following steps: in response to detecting a single-finger sliding operation performed on a touch-sensitive display screen of a target device, determining a first sliding offset value corresponding to the single-finger sliding operation, where the target device is communicatively connected to a head-mounted display device; sliding an anchor corresponding to the single-finger sliding operation in a 3D virtual interface of the head-mounted display device based on the first sliding offset value and a first preset sliding ratio, and displaying a ray from a target start point to the anchor in the 3D virtual interface, where the 3D virtual interface is displayed on a display screen of the head-mounted display device; and in response to detecting a single-finger tap operation performed on the touch-sensitive display screen and an anchor corresponding to the single-finger tap operation being at a target control location, creating a 2D virtual interface in the 3D virtual interface, and displaying an application window corresponding to the single-finger tap operation in the 2D virtual interface.

Computer program code for performing operations in some embodiments of the present disclosure may be written in one or more programming languages or a combination thereof. The programming languages include object-oriented programming languages such as Java, Smalltalk, C++, and further include conventional procedural programming languages such as the "C" language or similar programming languages. The program code may be executed entirely on a user computer, partly on the user computer, as a stand-alone software package, partly on the user computer and partly on a remote computer, or entirely on the remote computer or a server. When a remote computer is used, the remote computer may be connected to a user computer by using any type of network, including a local area network (LAN) or a wide area network (WAN), or may be connected to an external computer (for example, an Internet connection by using an Internet service provider).

The flowcharts and block diagrams in the accompanying drawings show system architectures, functions, and operations that may be implemented by systems, methods, and computer program products according to various embodiments of the present disclosure. In this regard, each block in the flowcharts or block diagrams may represent a module, a program segment, or a part of code, and the module, the program segment, or the part of code includes one or more executable instructions for implementing a specified logical function. It should also be noted that, in some alternative implementations, a function marked in the block may also occur in a sequence different from that marked in the accompanying drawings. For example, two consecutively represented blocks may be actually executed substantially in parallel, and may sometimes be executed in a reverse order, depending on a function involved. It should also be noted that each block in the block diagrams and/or the flowcharts and a combination of blocks in the block diagrams and/or the flowcharts may be implemented by using a dedicated hardware-based system designed to perform a specified function or operation, or may be implemented by using a combination of dedicated hardware and computer instructions.

The functions described above in this specification may be performed at least partially by one or more hardware logic components. As an example instead of a limitation, example types of hardware logic components that may be used include a field programmable gate array (FPGA), an application-specific integrated circuit (ASIC), an application specific standard product (ASSP), an system on chip (SOC), a complex programmable logic device (CPLD), and the like.

The foregoing descriptions are merely some preferred embodiments of the present disclosure and descriptions of the applied technical principles. A person skilled in the art should understand that the disclosure scope in the embodiments of the present disclosure is not limited to technical solutions formed by a specified combination of the foregoing technical features, but also covers other technical solutions formed by any combination of the foregoing technical features or equivalent features thereof without departing from the foregoing disclosure concept, for example, technical solutions formed by interchanging the foregoing features with technical features that have similar functions and that are disclosed (but not limited to) in the embodiments of the present disclosure.

What is claimed is:

1. A head-mounted display device, comprising:
   one or more processors;
   a display screen, configured to display a 3D virtual interface and a 2D virtual interface; and
   a storage apparatus, storing one or more programs, wherein
   when the one or more programs are executed by the one or more processors, the one or more processors are enabled to execute instructions including:
   in response to detecting a single-finger sliding operation performed on a touch-sensitive display screen of a target device, determining a first sliding offset value corresponding to the single-finger sliding operation, wherein the target device is communicatively connected to a head-mounted display device;
   sliding an anchor corresponding to the single-finger sliding operation in a 3D virtual interface of the head-mounted display device based on the first sliding offset value and a first preset sliding ratio, and displaying a ray from a target start point to the anchor in the 3D virtual interface, wherein the 3D virtual interface is displayed on a display screen of the head-mounted display device; and
   in response to detecting a single-finger tap operation performed on the touch-sensitive display screen and an anchor corresponding to the single-finger tap operation being at a target control location, creating a 2D virtual interface in the 3D virtual interface, and displaying an application window corresponding to the single-finger tap operation in the 2D virtual interface.

2. A non-transitory computer-readable medium, storing a computer program, wherein when the program is executed by a processor, causing the processor to perform instructions including:

in response to detecting a single-finger sliding operation performed on a touch-sensitive display screen of a target device, determining a first sliding offset value corresponding to the single-finger sliding operation, wherein the target device is communicatively connected to a head-mounted display device;

sliding an anchor corresponding to the single-finger sliding operation in a 3D virtual interface of the head-mounted display device based on the first sliding offset value and a first preset sliding ratio, and displaying a ray from a target start point to the anchor in the 3D virtual interface, wherein the 3D virtual interface is displayed on a display screen of the head-mounted display device; and in response to detecting a single-finger tap operation performed on the touch-sensitive display screen and an anchor corresponding to the single-finger tap operation being at a target control location, creating a 2D virtual interface in the 3D virtual interface, and displaying an application window corresponding to the single-finger tap operation in the 2D virtual interface.

3. A virtual interface operation method, comprising:

in response to detecting a single-finger sliding operation performed on a touch-sensitive display screen of a target device, determining a first sliding offset value corresponding to the single-finger sliding operation, wherein the target device is communicatively connected to a head-mounted display device;

sliding an anchor corresponding to the single-finger sliding operation in a 3D virtual interface of the head-mounted display device based on the first sliding offset value and a first preset sliding ratio, and displaying a ray from a target start point to the anchor in the 3D virtual interface, wherein the 3D virtual interface is displayed on a display screen of the head-mounted display device; and in response to detecting a single-finger tap operation performed on the touch-sensitive display screen and an anchor corresponding to the single-finger tap operation being at a target control location, creating a 2D virtual interface in the 3D virtual interface, and displaying an application window corresponding to the single-finger tap operation in the 2D virtual interface.

4. The method according to claim 3, wherein the method further comprises:

in response to detecting a sliding operation or a tap operation that is performed on the touch-sensitive display screen, sending the sliding operation or the tap operation to the display screen through mapping.

5. The method according to claim 3, wherein before the sliding an anchor corresponding to the single-finger sliding operation in a 3D virtual interface of the head-mounted display device based on the first sliding offset value and a first preset sliding ratio, the method further comprises:

determining the first preset sliding ratio based on a sliding speed of the single-finger sliding operation.

6. The method according to claim 5, wherein the sliding an anchor corresponding to the single-finger sliding operation in a 3D virtual interface of the head-mounted display device comprises:

in response to a touch control mode of the touch-sensitive display screen being a landscape mode, performing the following steps:

determining a vertical offset value of the anchor corresponding to the single-finger sliding operation in the 3D virtual interface based on a short-side offset value of the first sliding offset value in a short-side direction of the touch-sensitive display screen and the first preset sliding ratio;

determining a horizontal offset value of the anchor corresponding to the single-finger sliding operation in the 3D virtual interface based on a long-side offset value of the first sliding offset value in a long-side direction of the touch-sensitive display screen and the first preset sliding ratio; and sliding the anchor corresponding to the single-finger sliding operation in the 3D virtual interface based on the vertical offset value and the horizontal offset value.

7. The method according to claim 3, wherein the method further comprises:

in response to detecting a two-finger sliding operation performed on the touch-sensitive display screen, encapsulating the two-finger sliding operation as an encapsulation single-finger sliding operation, wherein the two-finger sliding operation corresponds to a target application window displayed in the 3D virtual interface;

determining a second sliding offset value corresponding to the encapsulation single-finger sliding operation; and sliding display content of the target application window based on the second sliding offset value and a second preset sliding ratio.

8. The method according to claim 7, wherein the method further comprises:

in response to detecting a two-finger tap operation performed on the touch-sensitive display screen, encapsulating the two-finger tap operation as an encapsulation single-finger tap operation, wherein the two-finger tap operation corresponds to the target application window; and in response to an anchor corresponding to the encapsulation single-finger tap operation being at the target control location, updating the target application window based on the encapsulation single-finger tap operation.

9. The method according to claim 3, wherein the method further comprises:

in response to detecting a three-finger sliding operation performed on the touch-sensitive display screen, and an application window being first displayed in the 3D virtual interface, determining a sliding direction, a sliding distance, and a sliding acceleration that correspond to the three-finger sliding operation.

10. The method according to claim 9, wherein the method further comprises:

in response to the sliding direction being upward, the sliding distance being greater than or equal to a first sliding distance, and the sliding acceleration being greater than or equal to a first sliding acceleration, switching to a desktop window.

11. The method according to claim 10, wherein the method further comprises:

in response to a previous application window of the target application window existing in the 3D virtual interface, the sliding direction being leftward, the sliding distance being greater than or equal to a second sliding distance, and the sliding acceleration being greater than or equal to a second sliding acceleration, switching to the previous application window.

12. The method according to claim 11, wherein the method further comprises:

in response to a next application window of the target application window existing in the 3D virtual interface, the sliding direction being rightward, the sliding distance being greater than or equal to a third sliding distance, and the sliding acceleration being greater than or equal to a third sliding acceleration, switching to the next application window.

* * * * *